United States Patent [19]

Webster

[11] Patent Number: 4,848,722
[45] Date of Patent: Jul. 18, 1989

[54] VALVE WITH FLEXIBLE SHEET MEMBER

[75] Inventor: Milo E. Webster, Braintree, Mass.

[73] Assignee: Integrated Fluidics, Inc., Plainville, Conn.

[21] Appl. No.: 155,038

[22] Filed: Feb. 11, 1988

Related U.S. Application Data

[63] Continuation-in-part of Ser. No. 131,751, Dec. 11, 1987, abandoned.

[51] Int. Cl.[4] ............................................... F16K 7/12
[52] U.S. Cl. ................................. 251/61.1; 137/884; 137/885
[58] Field of Search ............... 251/61.1; 137/885, 884, 137/613

[56] References Cited

U.S. PATENT DOCUMENTS

| | | | |
|---|---|---|---|
| 3,083,943 | 4/1963 | Stewart, Jr. et al. | 251/61 |
| 4,119,120 | 10/1978 | Mehaffy et al. | 137/885 |
| 4,168,724 | 9/1979 | Graffunder et al. | 251/61.1 X |
| 4,304,257 | 12/1981 | Webster | 137/559 |
| 4,353,243 | 10/1982 | Martin | 73/23.1 |
| 4,516,604 | 5/1985 | Taplin | 251/61.1 X |

*Primary Examiner*—Arnold Rosenthal
*Attorney, Agent, or Firm*—Hamilton, Brook, Smith & Reynolds

[57] ABSTRACT

A valve is disclosed comprising a first body portion (2) having a first surface (16), a second body portion (4) having a second surface (51) facing the first surface, a flexible sheet (8) positioned between the first and second surfaces, a void (4) in the first body portion created and defined by a concave surface (46) formed in the first surface and one side (18) of the flexible sheet.

There are at least two fluid passageways (20) (22) in the first body portion communicating with the void at spaced locations, at least one of the fluid passageways being a channel formed in the first surface and terminating at the void.

A source of pressure and vacuum (50) (54) is provided for flexing the sheet against and away from the first body portion in order that when the flexible sheet is flexed against the first body portion, the passageways are sealed from each other, and when the flexible sheet is flexed away from the first body portion the fluid passageways are placed in communication with each other by way of the void.

12 Claims, 7 Drawing Sheets

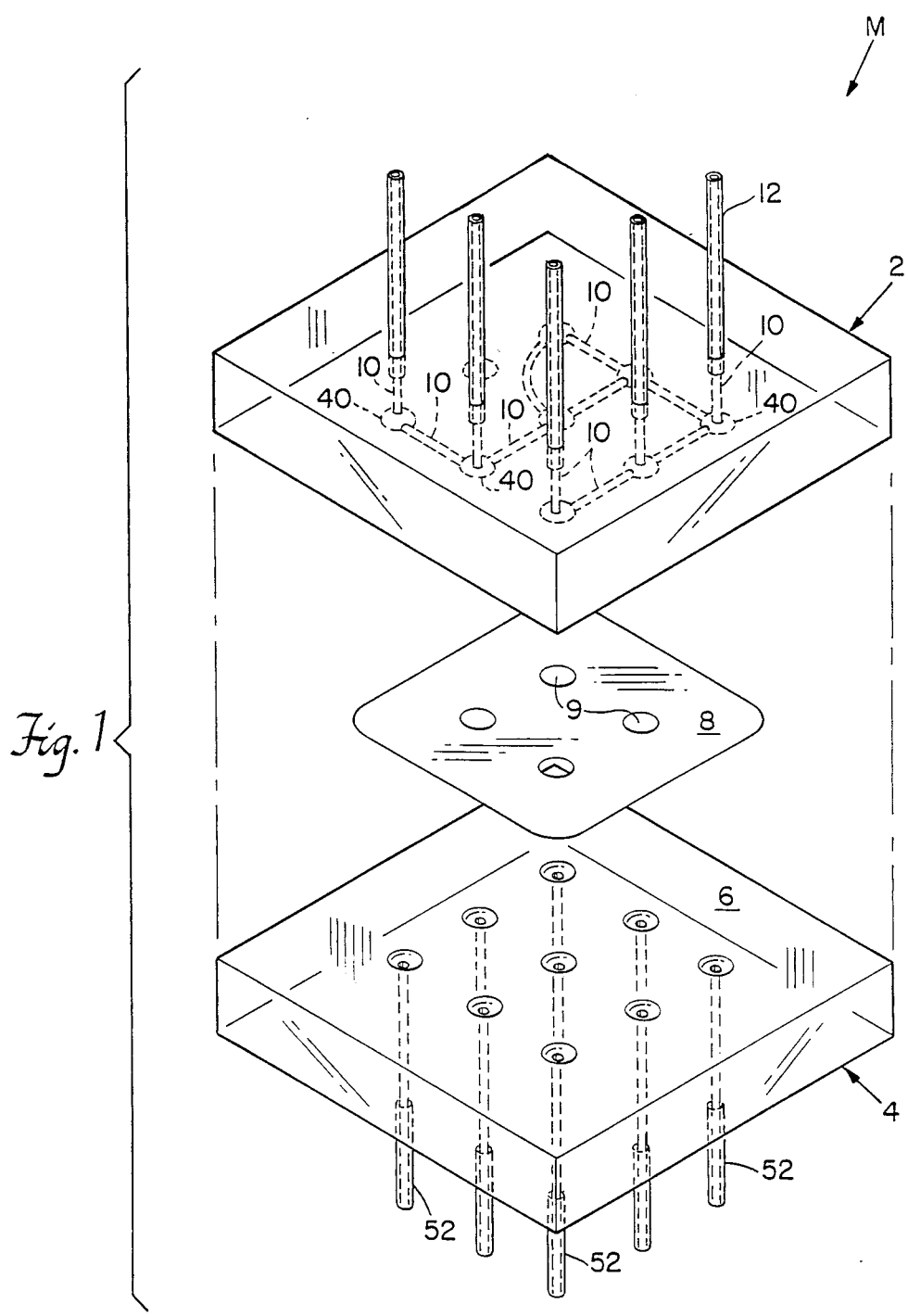

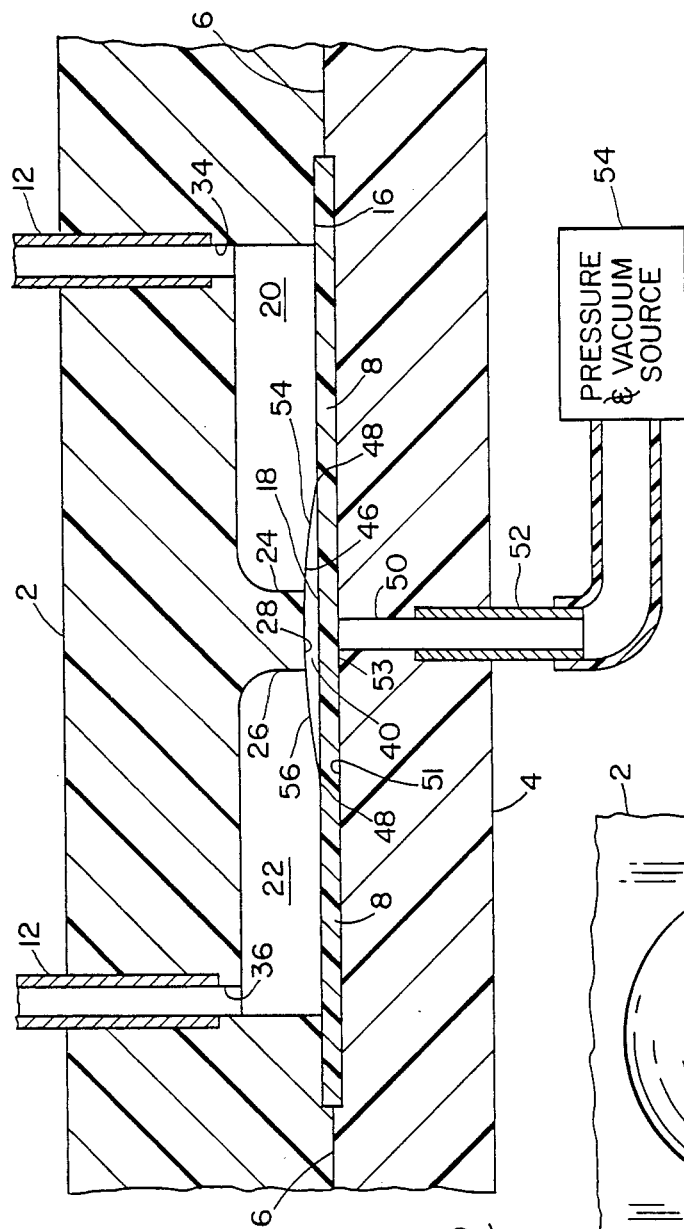
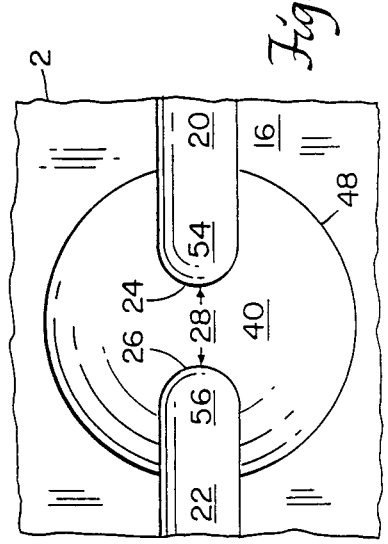

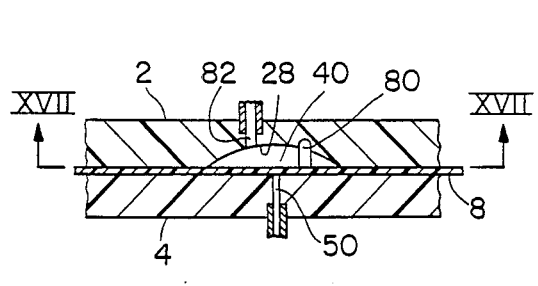
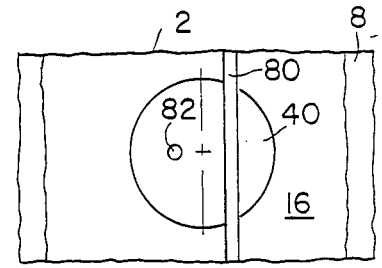
Fig. 16                Fig. 17
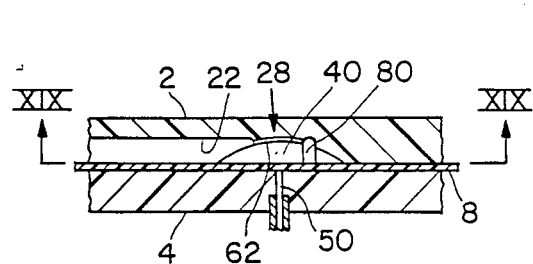
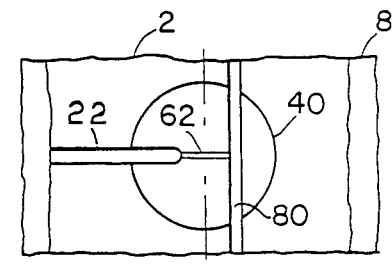
Fig. 18                Fig. 19
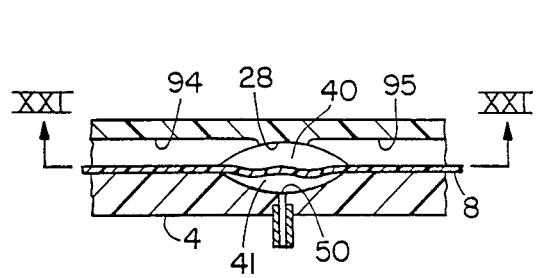
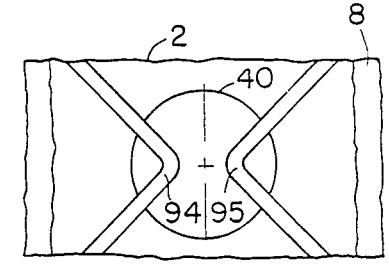
Fig. 20                Fig. 21
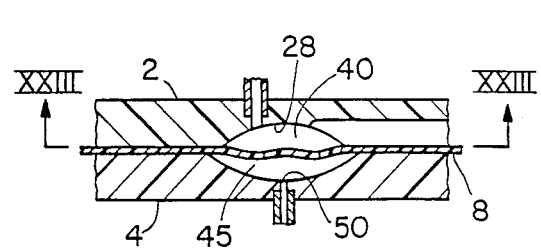
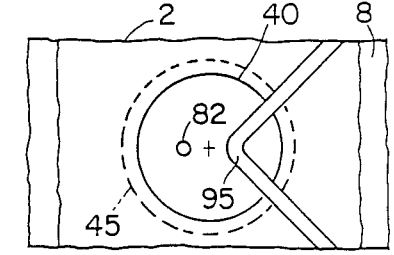
Fig. 22                Fig. 23

VALVE WITH FLEXIBLE SHEET MEMBER

This is a continuation-in-part of my earlier application, Ser. No. 131,751, filed 12-11-87, now abandoned.

FIELD OF THE INVENTION

This invention relates in general to valves and valve matrixes which are employed in flow networks for handling various types of fluids, and more particularly, it relates to valves that employ flexible sheet members for alternatively sealing and opening various valve ports and orifices.

BACKGROUND OF THE INVENTION

In accordance with an earlier invention covered by my U.S. Pat. No. 4,304,257, I disclosed a valve that includes a body member that has a "firm and stable support surface" and a flexible sheet member that has a surface for conforming and mating with the surface of the valve body member. There are at least two fluid flow channels in the surface of the body member separated from each other by a land portion. The surface of the land portion is coincident with the surface of the member in which it is formed; in this instance, the firm and stable support surface of the valve.

A mechanical actuator is employed to flex the sheet member between a first position in which a surface of the sheet is in mating and sealing engagement with the surface of the body member to block flow between the two channels and a second position in which the sheet surface is spaced from the first position to allow fluid flow across the land surface between the two flow channels.

The firm and stable support surface is disclosed as being flat as is the flexible sheet member that seals the flow channels.

The flexible sheet member is a manifold diaphragm sheet made of polyurethane or silicone and of sufficient thickness such that heads formed on the ends of stems of the mechanical actuators can be embedded in the sheet. This requires the sheet to have substantial thickness. Because the sheet is an elastomer, were it able somehow to be made thinner, it could be gas pervious which is undesirable.

The actuators are solenoid operated which are not only bulky but heavy and require substantial power for actuation. This is somewhat limiting to the function of the valve, particularly when many similar valves are assembled together in a manifold environment. The actuators also require extremely sensitive adjustment.

In accordance with my earlier invention, the flexible sheet is pulled physically downwardly into an aperture so that the surface of the sheet which is engageable with the firm and stable support surface is withdrawn from that surface placing two or more fluid passageways in communication. The flexure is all in one direction, that is, downwardly from the horizontal and returned to the horizontal.

Also in accordance with my earlier invention, when the flexible sheet is pulled away from the support surface, it exposes the land which is coincident with the support surface. A space is created, which when filled with a fluid flowing from one channel or passageway, can then flow out the second or additional passageways which are in communication with the space. It would be desirable if flow across the land could be channeled or directed to permit such flow to take place substantially immediately upon the flexible sheet surface being withdrawn from the support surface rather than waiting for the space to become filled or substantially filled.

It would be desirable if the flexing of the flexible sheet could be reduced to a minimum to avoid undue stress concentration at any one point or points and secondly, to reduce the tendency of the sheet to become stressed beyond its yieldpoint.

It would also be desirable if the solenoid actuated means for physically pulling the flexible sheet downwardly away from the support surface could be replaced with something simpler and equally reliable. Apparatus having less bulk nd weight and not requiring any adjustment at all, would be a substantial advantage. I have found that fluid pressure and/or vacuum are ideal for this purpose.

With the above objectives in mind, it has been possible to produce a flexible sheet operated valve which is lighter in weight, less bulky, less complicated, more reliable and less expensive than those made in accordance with my previous invention.

SUMMARY OF THE INVENTION

The present invention resides in a valve or valve manifold which may include more than one valve. Each valve, per se, comprises at least one valve body member, also called a first body portion. The body has a first surface, also called the valve body surface. As in my earlier invention, the first surface is firm and stable. There is a flexible valve sheet member having a surface for conforming and mating engagement with the valve body surface. There are at least two fluid passageways, designated first and second passageways, at least one of which is formed in the surface of the valve body member. Separating the fluid passageways is a land portion located between them. To this point, the valve is essentially the same as the valve disclosed in my earlier U.S. Pat. No. 4,304,257.

In the earlier patent, the entire surface of the land portion was coincident with the surface of the first body portion.

According to one aspect of the present invention, at least a part of the land portion, if not all, is depressed or channeled relative to the surface of the first body portion whereupon some, if not all of the land portion is not "coincident" with the firm and stable first surface as in my earlier patent. The "depression" may be upwardly or downwardly depending on the valve orientation. The channel, or canal as it is also called, across the land may connect any passageways regardless of their specific configurations.

There are means, hereinafter illustrated as pneumatic, provided for flexing the sheet member between a first position in which the valve sheet surface is in mating and sealing engagement with the valve body surface to sealingly block flow between the first and second passageways and a second position in which the sheet surface is spaced from the first position to allow flow to take place between the first and second passageways across the land portion.

In accordance with the present invention, the flow takes place, first through the depressed portion of the land or canal, as soon as the flexible sheet has moved a slight distance away from the first surface and before a substantial gap or void is created between the flexible sheet and the first surface. This speeds up the valve response time and permits the flexible sheet to "peel" from the surface of the first body portion.

In my prior invention, the first or firm and stable surface, was disclosed as planar and hence, the land was planar. In the present invention, it is immaterial whether this surface and the land be planar. They may be arcuate or partially arcuate and partially planar as will become more evident hereinafter.

In accordance with another feature of the invention, the valve includes a second body portion having a second surface which faces the first surface. The flexible sheet or valve sheet member is positioned between the first and second surfaces. A void is formed in the first body portion. It is created and defined by a concave surface formed in the first surface and by the side of the flexible sheet that faces the first surface.

There are at least two fluid passageways in the first body portion which communicate with the void and which passageways terminate in the concave surface. They are at spaced locations. Pneumatic means are provided to flex the sheet against and away from the first body portion. When the flexible sheet is flexed away, the passageways are placed in communication with each other by way of the void. However, when the flexible sheet is forced against the first body portion including the first surface and the concave surface, the passageways are sealed from one another. In this embodiment of the invention the flexible sheet flexes in one direction only, in other words, from a flat configuration into and out of a convex configuration.

Since the area of the unflexed sheet is initially the flat circular area of the void measured as the truncation surface or plane which is the base of the void, it is less than the area it occupies when flexed into engagement with the concave surface of the void, the flexible sheet then being stretched and rendered free of wrinkles.

Another embodiment of the invention involves creating a void in the second body portion which is located on the opposite side of the flexible sheet. The second void is created and defined by a concave surface formed in the second surface and hence, in the second body portion and the surface of the sheet facing the second void.

Pneumatic means are employed to flex the sheet toward and against the concave surface in the first body portion to seal the passageways and to flex the sheet away from the first concave surface returning it to the horizontal and then continuing in the same direction away from the horizontal into the second void. In the neutral position the flexible sheet is flat and unflexed, but since the concave surfaces are, in this embodiment, of the same dimension, their heights need only be half as much as if there were only one. The flexure is equal in opposite directions as distinguished from my earlier invention where flexure was only from the horizontal to arcuate.

Thus, the amplitude of flexure is 50% in one direction and 50% in the other, thereby reducing the amount of bend in the flexible sheet in any one direction by a half and thus increasing wear life. Also, the amount of permanent deformation of the flexible sheet is correspondingly reduced.

In accordance with another embodiment of the invention, the area of the base of the second concave surface and hence, of the void in the second body portion, is larger than that of the first concave surface. Thus, the void is larger in area and volume.

For ease and accuracy of manufacture, the voids may be made in the body portions by a ball end mill thereby resulting in voids which are truncated spheres. Hence, the land between the fluid passageways which communicate with the first void are spherical surfaces. In this embodiment as well, there are advantages to be gained by forming a canal directly from one passageway to another across the land surface which will not only aid the initial fluid flow from one passageway to another, but will provide additional surface area for the accommodation of any wrinkles which may be formed in the flexible sheet and thus, preclude undesirable pockets of fluid that would contribute to cross-contamination and carryover.

The passageways may be of many forms. They may be bores in the first body portion which pass directly into the first void. They may be channels or grooves formed in the first surface which intersect the void. They may be flow through channels, which are not blocked, per se, by valve closure but blocked from each other or other passageways or there may be any combination of grooves or bores or channels which are alternately sealed from and exposed, in part or in whole, to one another.

The canals which are formed in the lands may join a flow through passageway with one or more passageways.

In order to prevent the flexible film, which may be a polyester, as for example, a polyethylene film sold by Dupont under the trademark Mylar, from separating from the second surface when it is urged or biased into the sealing position, it is secured to that surface by pressure bonding or chemical bonding or an appropriate adhesive since this second surface is not in contact with the fluids passing through the valve system.

The above and other features of the invention including various novel details of construction and combinations of parts will now be more particularly described with reference to the accompanying drawings and pointed out in the claims. It will be understood that the particular valve with flexible sheet member embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

FIG. 1 is an exploded perspective view of a valve module having nine valves, on a larger-than-life scale, embodying the features of the invention.

FIG. 2 is a sectional rendition, on a greatly enlarged scale, of one valve body.

FIG. 3 is a bottom plan view of the actual valve site of the valve shown in FIG. 2.

FIG. 16 is a vertical sectional view on an enlarged scale of another embodiment of the invention.

FIG. 17 is a sectional view taken on the line XVII—XVII of FIG. 16.

FIG. 18 is another embodiment of the valve.

FIG. 19 is a sectional view taken on the line XIX—XIX of FIG. 18.

FIG. 20 is a sectional view of yet another embodiment of the valve.

FIG. 21 is a sectional view taken on the line XXI—XXI on section 18.

FIG. 22 is a sectional view of still another valve, and

FIG. 23 is a sectional view taken on the line XXIII—XXIII of FIG. 19.

DETAILED DESCRIPTION OF THE INVENTION

Figures 4, 4A:
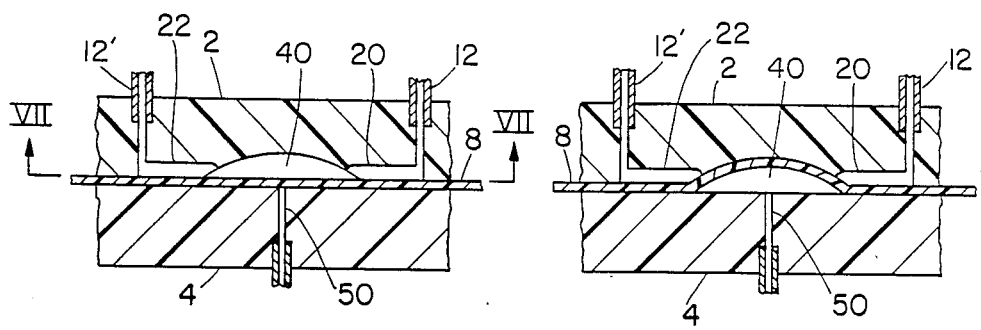
FIG. 4 is a sectional view on an enlarged but smaller scale than FIG. 2 of one embodiment of the invention with the valve in open position.
FIG. 4a is the valve of FIG. 4 in closed position.

In FIG. 1 there will be seen an exploded view of a valve array which is also known as a valve module or valve matrix designated by the reference character M. The module M includes a first valve body member 2 and a second valve body member 4 which may also be referred to as the upper and lower valve body members, respectively. They may be made of acrylic material or any other non-corrosive, relatively inert, material that may be machined or molded.

The valve body members engage one another at an interface 6. At the interface is located a flexible valve sheet member 8, which in the illustrative embodiment, is a sheet of polyethylene film of the type sold by Dupont under the trademark Mylar. In this instance the sheet of Mylar is approximately 0.0005 inches thick although it is not so limited. In fact, may be thicker or thinner depending upon the application. Holes 9 in the sheet 8 permit better bonding of the body members 2 and 4 and reduce the total force required to seal portions of the flexible sheet surface.

A plurality of passageways 10, through which fluid may flow, are formed in one of the body members, in this instance the upper or first body member 2. As will become more apparent hereinafter, the passageways 10 may be holes, grooves, flow through channels or any convenient fluid conduit form. Various connecting tubes 12 lead to an from the passageways 10 to reservoir and/or other equipment.

A typical single valve will be seen in FIG. 2 in cross-section, substantially larger than actual life size. The body portions 2 and 4 are secured to each other at the interface 6 with the flexible sheet 8 of Mylar sandwiched between them. The body members, for example, may be screwed or bolted to one another. In this instance they are molecularly bonded.

The first body member has a first surface 16. As in my earlier patent, surface 16 is a "firm and stable surface." The upper surface 18 of the sheet 8 is engageable with surface 16.

Formed in the upper body portion 2 are a pair of elongate passageways 20 and 22 which in cross-section are semi-circular for convenience of manufacture but not necessarily so. These passageways are broadly represented in FIG. 1 as the passageways 10. They terminate at points 24 and 26 (FIG. 3) which are spaced from each other.

Between the terminal points 24 and 26 of the passageways 20 and 22, there is a portion of the first body member which is an arcuate land 28 as will be further described hereinafter.

The ends of the passageway are each connected by transverse bores 34 and 36, to tubes 12 which, in turn, may be connected to fluid sources, reservoirs or other equipment. The purpose of the valve is to prevent and permit flow between the passageways 20 and 22.

A void 40 is formed in the first body portion 2 and is created and defined by a concave surface 46 formed in the first surface 16 and by the upper surface 18 of the flexible sheet 8 which faces the first surface 16. As seen in FIG. 2, the void 40 is a truncated sphere having a circumference 48 (FIG. 3) in the first surface 16. Hence the land 28 is arcuate.

In one embodiment of the invention, the land 28 is approximately 0.03 inches across, i.e., from point 24 to 26. The depth (or height) of the void is approximately 0.005 inch, the void having been formed by a ball end mill of 25/32 inch diameter. These dimensions are illustrative of one valve which has been found to work satisfactorily, but are not limiting of the invention.

A control passageway 50 is connected by an appropriate conduit 52 to a source of pressure and/or vacuum 54. The control passageway 50 is formed in the second body member 4 and terminates in the second surface 51 which is the upper surface of the valve body portion 4. Accordingly, the control passageway is in communication with the lower surface 53 of the flexible sheet 8. When the control passageway 50 is pressurized, the flexible sheet 8 is caused to move upwardly into the void 40 and into sealing engagement with the land 28, sealing the areas 54 and 56, where the passageways 20 and 22 intersect with the void 40.

As long as pressure is applied against the lower surface 53 of the sheet 8, the valve will be in closed position. When pressure is relieved in the control passageway 50, or if it is a negative pressure, the sheet will return to the FIG. 2 position and fluid may again flow between the passageways 20 and 22 by way of the void 40.

As thus described so far, the invention may be stated as residing in a valve which comprises a first body portion 2 which has a first surface 16. There is a second body portion 4 which has a second surface 51 which faces the first surface 16 and a flexible sheet 8 is positioned between the first and second surfaces. The void 40 is formed in the first body portion 2 and it is defined by the concave surface 46 intersecting the surface 16 in a circle periphery 48 and by the side 18 of the flexible sheet 8. The two fluid passageways 20 and 22 communicate with the void 40 at spaced locations 24 and 26. A pressure and/or vacuum source 54 connected to the control passageway 50, flexes the sheet toward and away from the first body portion 2 whereby when the sheet 8 is flexed upwardly, the passageways 20 and 22 are sealed from each other and when the flexible sheet 8 is flexed away from the first body portion as seen in FIG. 2, the fluid passageways are placed in communication with each other by way of the void 40.

As a practical matter, the lower surface of the sheet 8, i.e., surface 53 may be cemented or otherwise secured to the surface 51 of the lower body portion 4 outside of the periphery 48 of the void 40 to assure that the flexible sheet is not peeled from contact with the lower body portion which might prevent bubbles and leaks from occurring between the control passageway 50.

Figure 7:
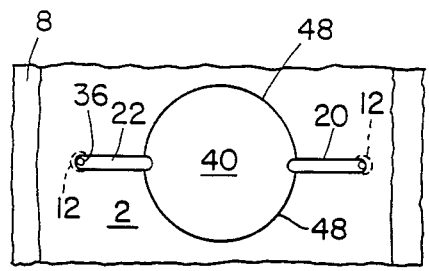
FIG. 7 is a sectional view taken on the line VII—VII of FIG. 4.
Figure 8:
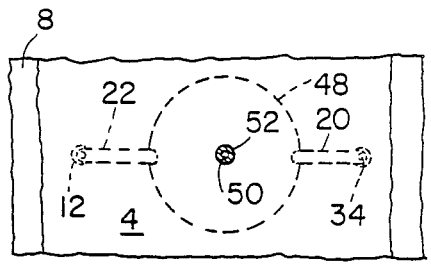
FIG. 8 is a sectional view taken on the line VIII—VIII of FIG. 5.

The opened and closed positions of the valve are shown schematically in FIGS. 4 and 4a. FIG. 4 shows the passageways 20 and 22 in open communication by way of the void 40 and FIG. 4a shows them being closed by the flexible sheet 8. The relative positions of the parts are also illustrated in FIGS. 7 and 8.

It will be noted that the actual flexure of the sheet 8 takes place at the periphery 48 of the void 40. When the sealing sheet 8 is in the closed position, i.e., that shown in FIG. 4a, the area of the then arcuate, flexed portion is greater than the flat area of the unflexed portion. The sheet when flexed is a spherical dome defined by the surface 46 of the void 40.

When a sheet is in the unflexed position or that shown in FIG. 4, the area of the portion is a flat circle having a circumference 48. Thus, the sheet in flexed position against the surface 46 of the void is stretched to some extent whereby any wrinkles or voids are eliminated and good quality sealing takes place. This is also seen in FIG. 7. 2 Referring next to FIGS. 5 and 5a, another embodiment of the invention will be seen, wherein there is a second void 41 which is formed in the second body portion 4 of the valve. It is on the opposite side of the flexible sheet 8 and it is defined by a concave surface 43, which also may be spherical, formed in the surface 51 of the lower body portion 4 and the opposite side 53 of the flexible sheet 8.

Figures 5, 5A:
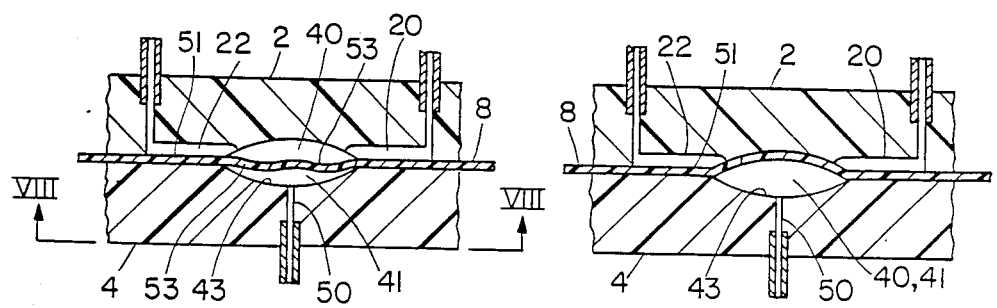
FIG. 5 is another embodiment of the valve in open position.
FIG. 5a is the valve of FIG. 5 in closed position.

In this modification, when the control passageway 50 is pressurized, the void 41 is pressurized thereby causing the flexible sheet to move upwardly into the void 40 sealing the passageways 20 and 22 as seen in FIG. 5a. When the pressure in the control passageway 50 is caused to fall, the pressure in the passageways 40 and 41 will be equal and the sheet will occupy the unflexed position as shown in FIG. 5. Note that it is wrinkled, having been stretched when first expanded upwardly. Conversely, if the pressure in the passageway 50 is negative, the flexible sheet 8 may be drawn down into the void 41 and engage the surface 43. In the FIG. 5 position the valve is "open" and in the FIG. 5a position the valve is in the "closed" position.

Figures 6, 6A:
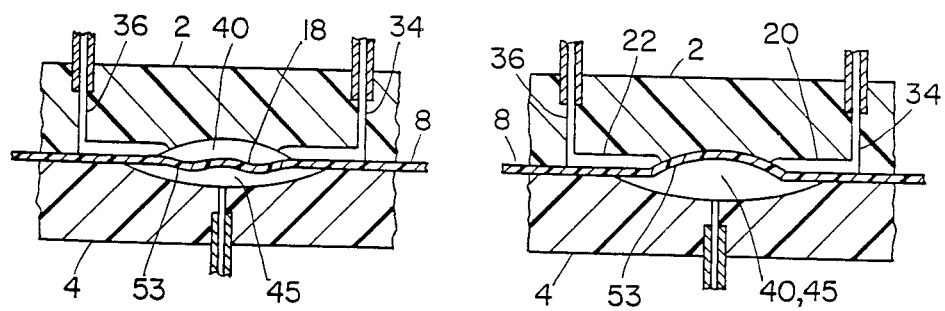
FIG. 6 is another embodiment of the valve in open position.
FIG. 6a is the valve of FIG. 6 in closed position.

Another embodiment of the invention is shown in FIGS. 6 and 6a. The second void herein designated 45 has a greater diameter than the void 40 in the first body member 2.

Figure 9:
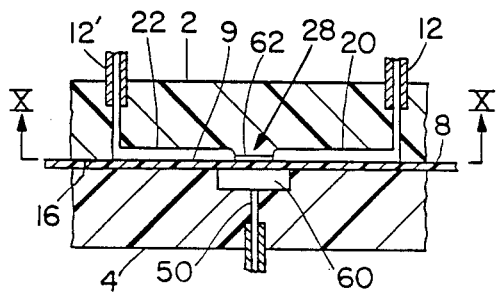
FIG. 9 is yet another embodiment of the valve shown in vertical section.
Figure 10:
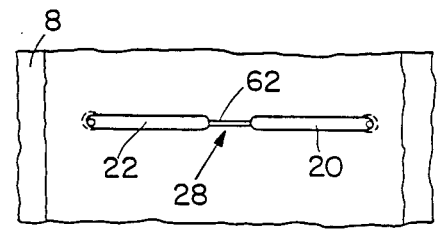
FIG. 10 is a sectional view taken on the line X—X of FIG. 9.

Referring next to FIGS. 9 and 10, the valve is illustrated as not having a void in the upper body portion 2 but is constructed much the same as the valve shown in my prior patent. There is a chamber 60 in the lower or second body portion 4 to which the control passageway 50 is connected to permit the flexible member 8 to be drawn downwardly to open the valve as in my prior patent. However, the firm and stable surface 16 referred to in my prior patent which includes the land 28 between the passageways 20 and 22, is provided with a groove, channel or canal 62 between the passageways. In other words, at least a portion of the surface of the land, the portion being the channel 62, is depressed, albeit upwardly, relatively to the surface 16 of the valve body portion 2. Thus, not all of the land portion 28 is coincident with the firm and stable surface 16. In this embodiment, when the valve is open, flow takes place first through the depressed portion or canal 62, as it is also called, as soon as the flexible sheet 8 has moved a slight distance away from the surface 16 and before a substantial gap or void is created between the flexible sheet surface 9 and the surface 16. This speeds up the valve response time. The canal 62 aids in valve opening especially if the valve were to have a tendency to stick. It aids in getting the opening started whereby the valve sheet member 8 "peels" away as the valve opens. This phenomenon is not unlike a flexible suction cup coming off a smooth surface. Pulling it straight off requires much force but cracking an edge in advance permits it to be "peeled" easily. The canal 62 also provides more surface area and thereby aids in compensating for the wrinkles and precludes fluid entrapment.

Figure 11:
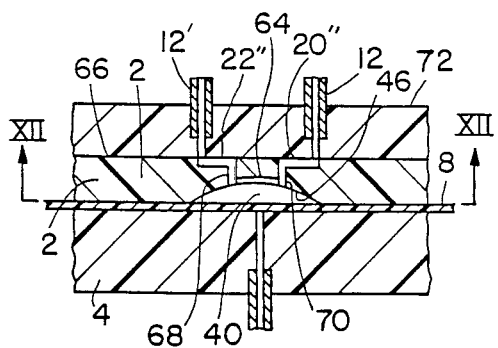
FIG. 11 is still another embodiment of the valve.

The same concept is illustrated in FIG. 11 where there is a void 40 in the first body portion 2 and where there is an arcuate canal 64 formed in the arcuate surface 46 of the void 40. The same principle of operation applies as in the FIG. 9 embodiment.

FIG. 11 also illustrates another embodiment wherein the passageways 20" and 22" are formed as channels in the uppermost surface 66 of the upper body portion 2 and communicate with the void 40 by way of vertical passageways 68 and 70 in a backing body member 72 which engages the surface 66 of the body member 2 and, in effect, seals the passageways 20" and 22". The pipes or conduits 12 and 12' are thus formed in the backing member 72 where heretofore they had been fitted directly into the first body portion 2.

Figure 14:
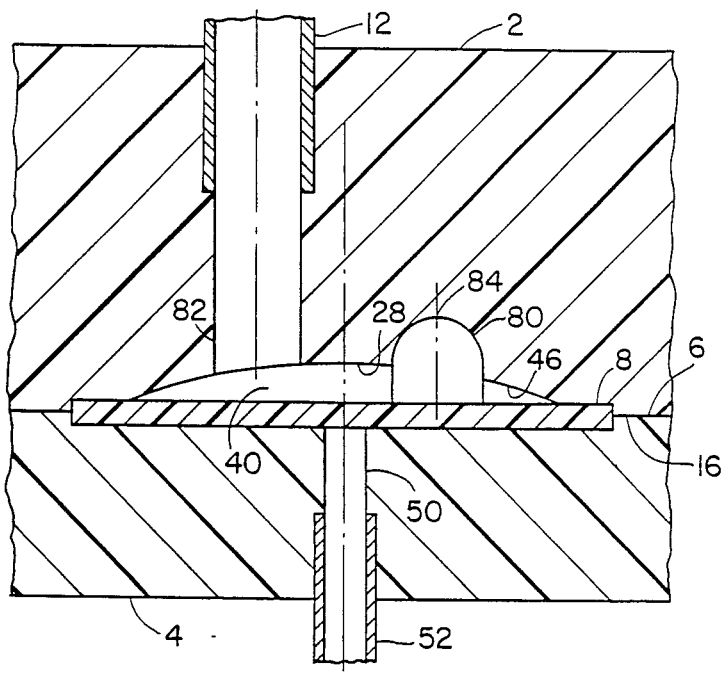
FIG. 14 is a sectional rendition, on a greatly enlarged scale, similar to FIG. 2, of an alternative valve body.
Figure 15:
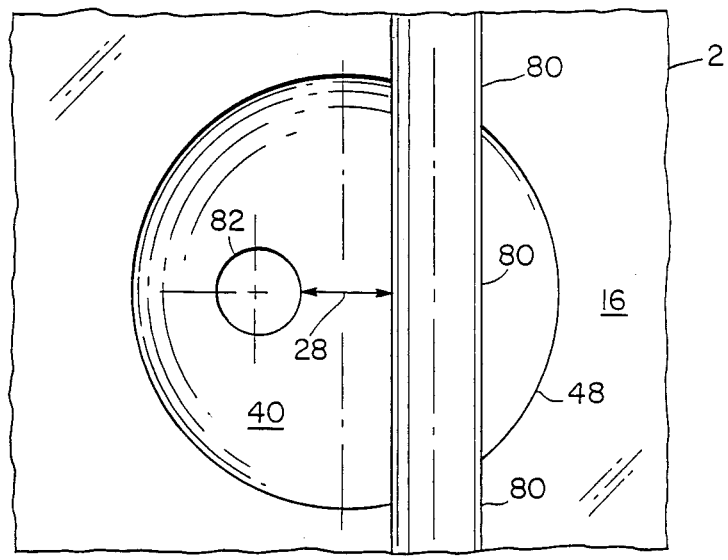
FIG. 15 is a bottom plan view of the valve site of the valve shown in FIG. 14.

Another embodiment of the invention resides in the employment of flow through passageways. As seen in FIGS. 14 and 15 a flow through passageway or channel 80 is formed in the first surface 16, initially outside the void 40, then passing through the void and finally extending again outside the void while in the surface 16. The other passageway is illustrated as a bore 82 terminating and communicating directly with the void 40. The land 28 is located between the flow through channel 80 and the bore 82.

It will noted that the depth of the bore, i.e., the distance from the surface 16 to a point 84 which is the apex of the flow through channel as seen in FIG. 14, is deeper, albeit upwardly, than the surface 46 of the void.

When the flexible valve sheet member 8 is flexed against the surface 46, the channel 80 is not completely blocked off and flow will continue. The channel will be restricted, however, by from about 20 to 30% of its area, but fluid will continue to flow. The flow through passageway 82, however, is blocked off from the void 40 and hence, the flow through channel 80 on flexure of the valve sheet 8.

Figure 13:
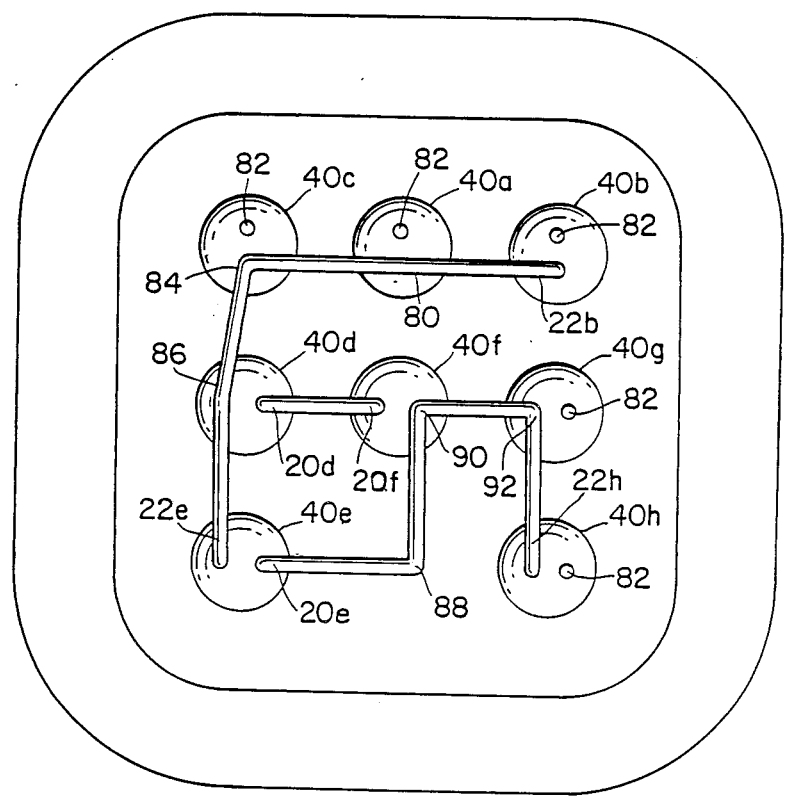
FIG. 13 is a schematic representation of a valve module having eight valve sites connected by an illustrative array of passageways.

Various configurations of flow through channels in combination with other passageways will be seen in FIG. 13. At the top center valve site 40a is a straight flow through channel 80 and a passageway 82 intersecting the void 40 as illustrated in FIGS. 14 and 15. Flow may take place in either direction, i.e., left or right in the flow through passageway 80. To the right is located a void or valve site 40b which includes a fluid passageway 22, as for example, similar to that shown in FIGS. 2 and 3 and a direct passageway 82.

At valve site 40c there is an elbow bend 84 in the flow through passageway.

At valve site 40d there is a substantially straight flow through passageway with a slight angle at 86. The flow through passageway continues to valve site 40e where it enters the void by way of a straight passageway 22e and exits by a passageway 20e.

Also exiting from valve site 40d is a straight passageway 20d which leads to valve site 40f and enters by a straight passageway 20f.

A right angle bend occurs in the passageway at 88 and another elbow bend 90 takes place in the valve site 40f. Still another right angle bend 92 occurs in valve site 40g and continues on to a straight passageway 22h in valve site 40h.

Each of the valves sites has its own flexible valve sheet member which is independently actuated into closed and open positions in preprogrammed fashion relative to the other valves.

The various valve combinations will be seen with regard to FIGS. 16 to 23. FIGS. 16 and 17 illustrate, as do FIGS. 14 and 15, a straight flow through valve passageway 80 and a direct passageway 82 in the valve site or void 40.

Figure 12:
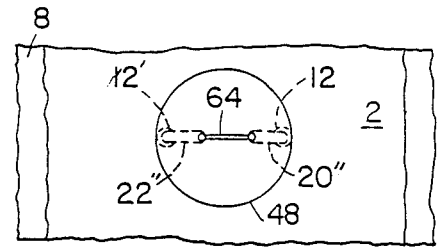
FIG. 12 is a sectional view taken on the line XII—XII of FIG. 11.

FIGS. 18 and 19 illustrate a straight flow through passageway 80 in combination with a straight passageway 22. The land 28 therebetween includes a canal 62 of the type shown in FIGS. 11 and 12.

FIGS. 20 and 21 illustrate right angle flow through valves 94 and 95 which when open permit mixture of fluids within the void 40 and when closed, interrupt the communication and fluid will flow independently through the passageways 94 and 95 without mixing.

FIGS. 20 and 21 also illustrate a void 41 in the lower or second body member 4 of the type shown in FIG. 5, i.e., the same diameter as the void 40.

FIGS. 22 and 23 show the void 45 in the second body member 4 to be of larger diameter than the void 40 in the upper member.

FIGS. 22 and 23 also illustrate the combination of a straight passageway 82 and a right angle flow through passageway 95.

One of the functions of a flow through passageway embodied in this invention is that it permits mixing of two fluids or the venting of a fluid in the configurations shown in FIGS. 16 to 23. Fluid may also be injected into another passageway or vented. The configuration shown in FIGS. 18 and 19 permit mixing of fluids. These are merely representatives of the various functions that may be performed with appropriate sequential pulsing of the valves.

I claim:

1. A valve comprising:
a first body portion having a first substantially flat surface,
a second body portion having a second substantially flat surface facing the first surface,
a flexible sheet positioned between the first and second surfaces,
a fluid receiving chamber comprising a void in the first body portion created and defined by a concave surface formed in the first substantially flat surface and a first side of the flexible sheet,
at least two fluid passageways formed in the first body portion communicating at spaced locations with the void which forms the fluid receiving chamber,
at least one of the fluid passageways being a flow through channel formed in the first substantially flat surface outside the void, then passing through the void and extending again outside the void in the substantially flat surface, the flow channel extending deeper into the first body portion than the concave surface,
means for flexing the sheet against and away from the concave surface formed in the first body portion,
in order that when the flexible sheet is flexed against the concave surface formed in the first body portion, the passageways are sealed from each other with the deeper-extending flow through channel remaining open to flow, and
when the flexible sheet is flexed away from the concave surface in the first body portion the fluid passageways are placed in communication with each other by way of the void.

2. A valve comprising:
a first body portion having a first substantially flat surface,
a second body portion having a second substantially flat surface facing the first surface,
a flexible sheet positioned between the first and second surfaces,
a fluid receiving chamber comprising a void in the first body portion created and defined by a concave surface formed in the first substantially flat surface and a first side of the flexible sheet,
at least two fluid passageways formed in the first body portion communicating at spaced locations with the void which forms the fluid receiving chamber,
at least one of the fluid passageways being a flow through channel formed in the first substantially flat surface outside the void, then passing through the void and extending again outside the void in the substantially flat surface, the flow channel extending deeper into the first body portion than the concave surface,
a pressure chamber comprising a second void in the second body portion aligned with the first void and on the opposite side of the flexible sheet,
the pressure chamber comprising the second void being created and defined by a second concave surface formed in the substantially flat second surface and the opposite side of the flexible sheet,
means for flexing the sheet against and away from the concave surface formed in the first body portion,
in order that when the flexible sheet is flexed against the concave surface in the first body portion, the fluid passageways are sealed from each other with the deeper extending flow through channel remaining open to flow, and
when the flexible sheet is flexed away from the concave surface the first body portion fluid passageways are placed in communication with each other by way of the first void.

3. A valve comprising:
a first body portion having a first substantially flat surface,
a second body portion having a second substantially flat surface facing the first surface,
a flexible sheet positioned between the first and second surfaces,
a fluid receiving chamber comprising a void in the first body portion created and defined by a concave surface formed in the first substantially flat surface and a first side of the flexible sheet,
at least two fluid passageways formed in the first body portion communicating at spaced locations with the void which forms the fluid receiving chamber, at least one of the fluid passageways being a flow through channel formed in the first substantially flat surface outside the void, then passing through the void and extending again outside the void in the substantially flat surface, the flow channel extending deeper into the first body portion than the concave surface, a pressure chamber comprising a second void in the second body portion aligned with the first void and on the opposite side of the flexible sheet, the pressure chamber comprising the second void being created and defined by a second concave surface formed in the substantially flat second surface and the opposite side of the flexible sheet, means for flexing the sheet again and away from the concave surface formed in the first body portion, in order that when the flexible sheet is flexed against the concave surface in the first body portion, the fluid passageways are sealed from each other with the deeper extending flow through channel remaining open to flow, and when the flexible sheet is flexed away from the concave surface the first body portion fluid passageways are placed in communication with each other by way of the first void, the second concave surface and hence, the void in the second body portion, having a larger diameter than the first concave surface and hence the void in the first body portion, so that equal pressure in both voids will create a greater force on the surface on the sheet which faces the larger void.

4. A valve according to claim 1 wherein the other fluid passageway is a bore terminating in the void.

5. A valve according to claim 2 wherein the other fluid passageway is a bore terminating in the first void.

6. A valve according to claim 3 wherein the other fluid passageway is a bore terminating in the first void.

7. A valve according to claim 1 wherein the other fluid passageway is a flow through channel.

8. A valve according to claim 2 wherein the other fluid passageway is a flow through channel.

9. A valve according to claim 3 wherein the other fluid passageway is a flow through channel.

10. A valve according to claim 1 wherein the other fluid passageway is a channel formed in the first surface.

11. A valve according to claim 2 wherein the other fluid passageway is a channel formed in the first surface.

12. A valve according to claim 3 wherein the other fluid passageway is a channel formed in the first surface.

* * * * *